Sept. 28, 1965  L. C. MORTON  3,208,133
VALVE ASSEMBLY MACHINE AND METHOD FOR ASSEMBLING A VALVE
Filed Jan. 24, 1964  3 Sheets-Sheet 1
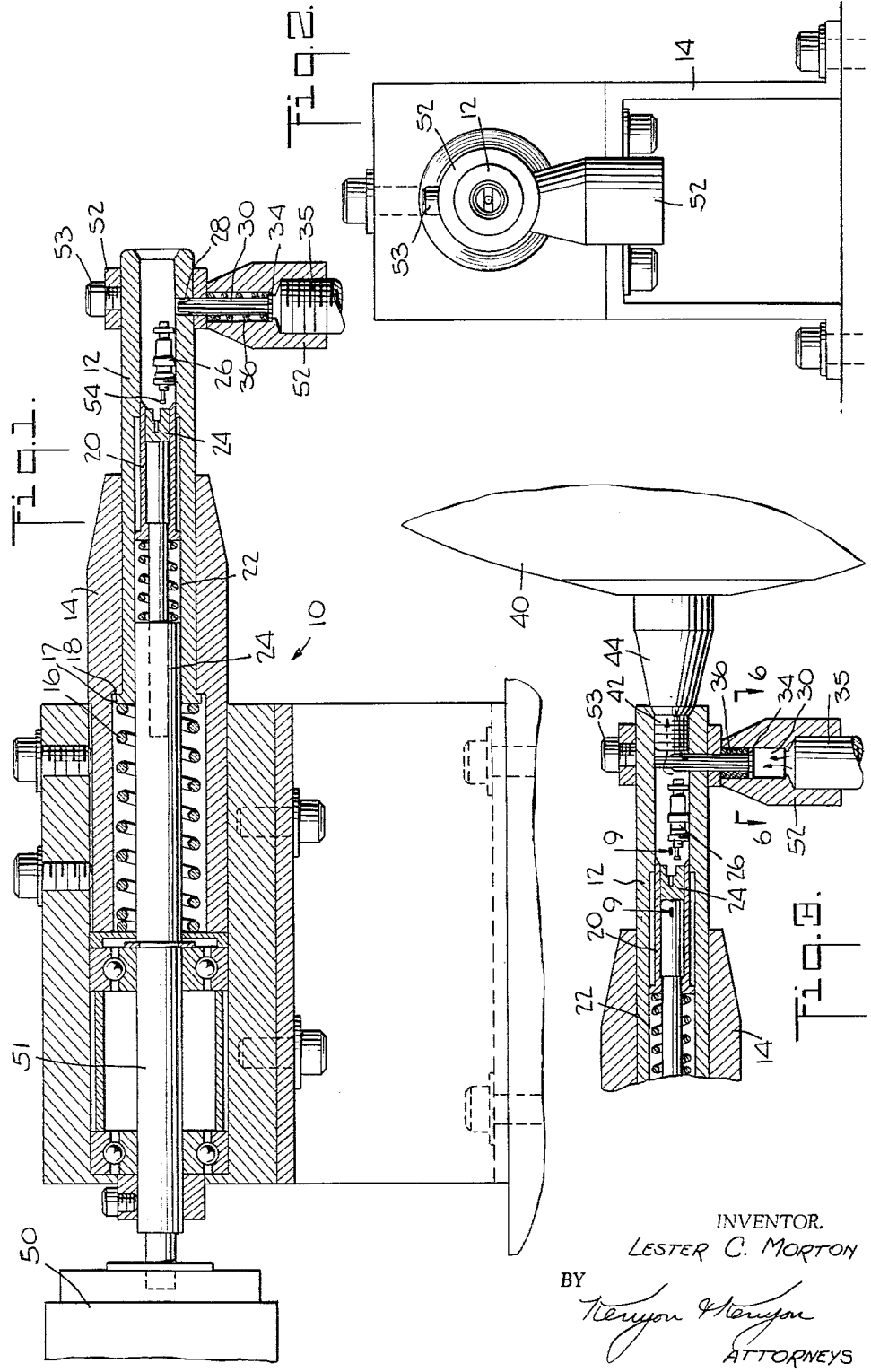
INVENTOR.
LESTER C. MORTON
BY
ATTORNEYS

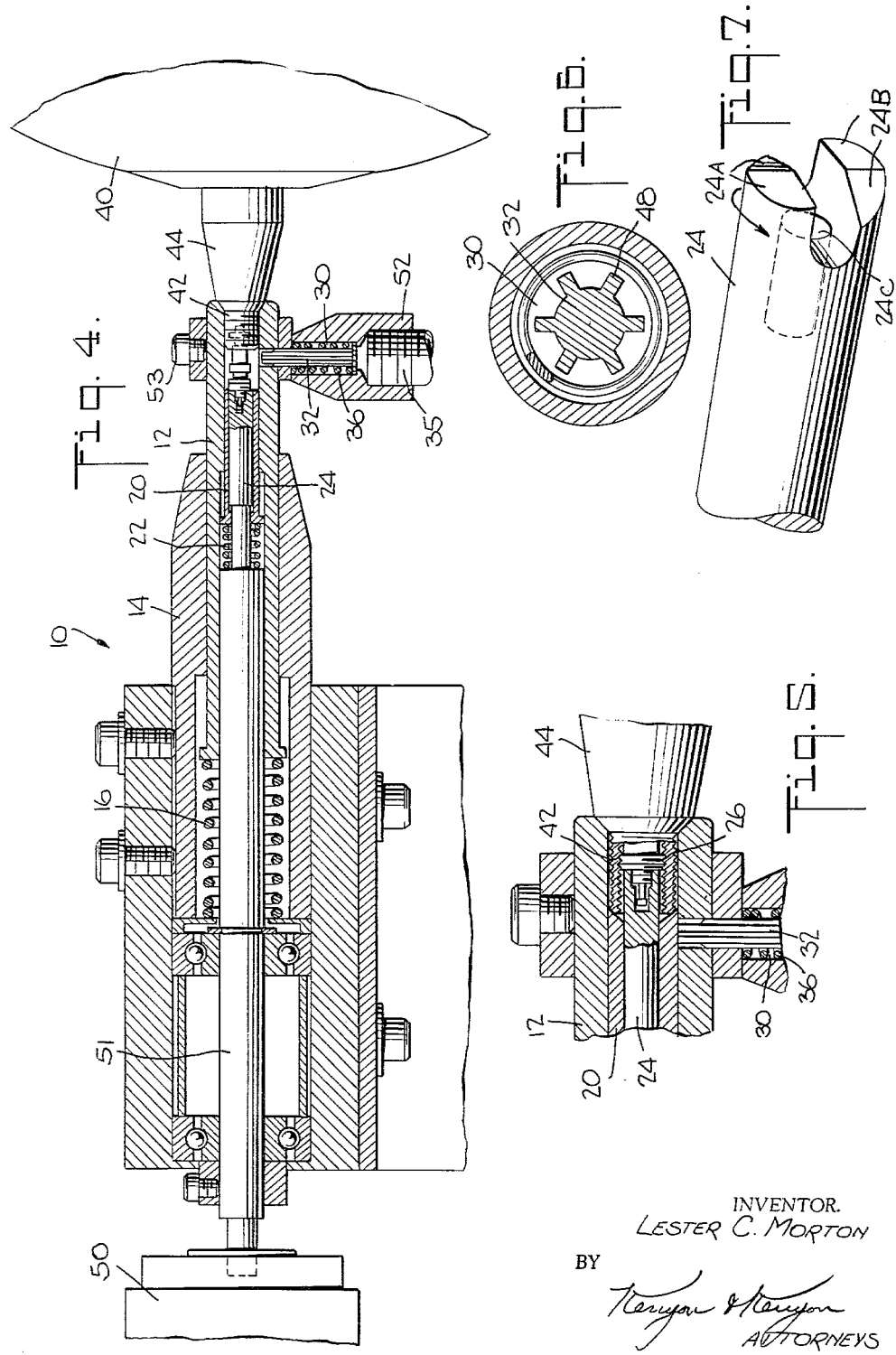

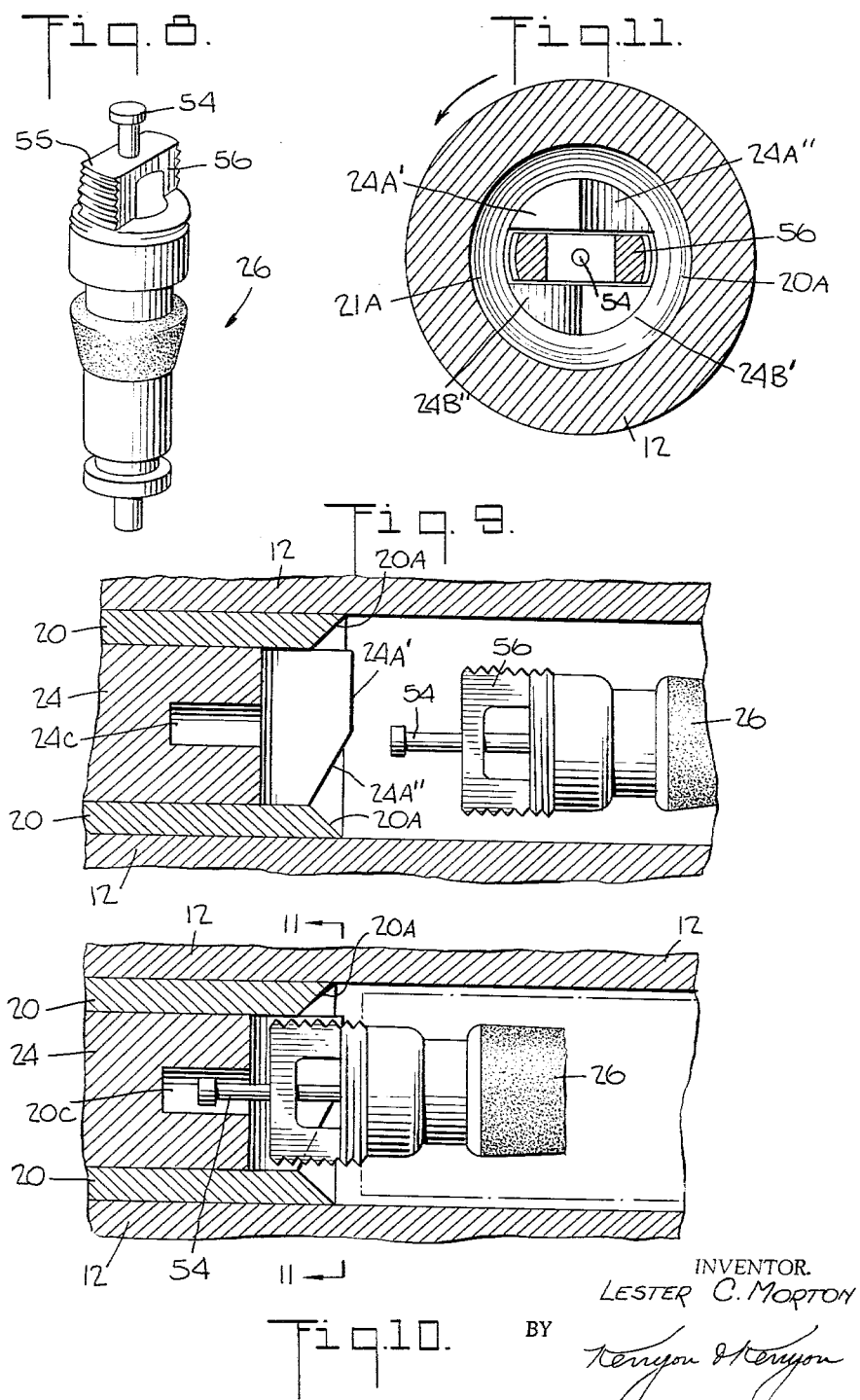

United States Patent Office 3,208,133
Patented Sept. 28, 1965

3,208,133
VALVE ASSEMBLY MACHINE AND METHOD
FOR ASSEMBLING A VALVE
Lester C. Morton, Dunmurry, Northern Ireland, assignor to National Distillers and Chemical Corporation, Richmond, Va., a corporation of Virginia
Filed Jan. 24, 1964, Ser. No. 340,042
8 Claims. (Cl. 29—208)

This invention relates in general to a valve assembly machine for assembling a valve, and more particularly to a machine for quickly inflating a tire tube and then immediately inserting the core of a tire tube valve into the valve sleeve, thereby assembling the valve.

Prior to this invention, the standard method of assembling a tire tube valve and of checking the inner tube for leaks was to screw the valve core into the valve body and then to inflate the tube through the core so that the tube and valve could be checked for leaks. The sequence of first assembling the entire valve and then inflating the tube seemed the natural sequence since it is desired to check both tube and valve for leaks. In addition, since the valve is the means for admitting air under pressure to the tube, it has always appeared necessary to assemble the valve so that a means for admitting air under pressure to the tube could be obtained.

In a factory where the assembled tube is manufactured, the method of inflating and testing the inner tubes is thus no different than that employed by the automobile driver in inflating and checking his tube. For a factory, this procedure is relatively slow when one takes into account the availability in a factory of a rapid flow of air under pressure and the large volume of inner tubes manufactured.

It is a major purpose of this invention to provide a much faster technique for inflating and coring and testing a tire inner tube.

It is a further purpose of this invention to provide a machine that will inflate an inner tube at a fast rate and also complete the assembly of the inner tube valve.

It is a broad purpose of this invention to avoid the waste of time and manpower in the prior art assembly techniques.

In brief, this invention involves a machine for holding the valve core apart from, but in close proximity to, the valve body so that compressed air can be forced through the wide open valve body at a relatively fast rate to inflate the tube. As soon as the tube is inflated, the valve core and valve body are simply and rapidly brought together with the core rotating so that the valve core is screwed into the valve body to form a normally closed air tight valve.

Other purposes and objects of this invention will become obvious from a consideration of the following detailed description and drawings, in which:

FIG. 1 is a longitudinal cross-sectional view of the machine of this invention showing a valve core in position to be assembled;

FIG. 2 is an elevation view of the working end of the machine of FIG. 1;

FIG. 3 is a longitudinal cross-section of the working end of the machine of FIG. 1 showing a tire tube in position to be inflated;

FIG. 4 is a cross-sectional view of the machine of this invention showing the valve core in position to be screwed into the valve body after the tube has been inflated;

FIG. 5 is a longitudinal cross-section of the working end of the machine of FIGS. 1 and 4 showing the valve core assembled into the valve body;

FIG. 6 is a cross-sectional view along the plane 6—6 of FIG. 3 showing the mechanism for engaging the valve core so that air can be pumped into the tube without being blocked by the valve core;

FIG. 7 is a perspective view of the core driver for positioning the valve core and inserting the valve core into the valve body;

FIG. 8 is a perspective view of a valve core;

FIG. 9 is a longitudinal cross-section of a portion of the working end of the machine, taken along the plane 9—9 of FIG. 3, showing the relation of the valve core and guide sleeve prior to the seating of the core in the core driver;

FIG. 10 is a view similar to FIG. 9 except showing the valve core seated in the guide sleeve; and FIG. 11 is a cross-sectional view along the plane 11—11 of FIG. 10.

FIGS. 1 and 2 illustrate the machine 10 of this invention. The important novel elements of this machine 10 are contained in the front or working end of the machine, which is the right-hand portion of FIG. 1. A barrel 12 is mounted within the frame 14 in such a fashion that the barrel 12 is movable along its major axis. The barrel 12 is spring loaded by the spring 16 so as to be normally held in its forwardmost position. A flange 17 at the rear end of the barrel 12 serves both to engage the spring 16 and to limit the forward extension barrel 12 by engagement with the shoulder 18 on the frame 14.

Within the barrel 12 there is a spring loaded guide sleeve 20 which is also kept in a normally forward position by means of the spring 22 and which may be retracted by being pushed against the spring 22. The core driver 24 is located within the guide sleeve 20. This core driver 24 is free to rotate relative to the guide sleeve 20 and has a forwardly facing seat that is adapted to receive and hold the pin end of a tire valve core. A function of this core driver 24 is to screw the valve core into the valve body, in a fashion that will be described in detail further on.

A valve core 26 is shown positioned in the barrel 12. The valve core 26 is normally manually placed in the barrel 12 prior to the start of the machine 10 cycle.

A radial opening 28 in the side of the barrel 12 communicates between the interior of the barrel 12 and an open shaft 30. As may best be seen in FIG. 6, a splined gate 32 extends down the shaft 30. The splined gate 32 has a perforated base disc 34 which is spring loaded by the spring 36 so that the splined gate 32 is normally in the retracted position shown in FIG. 1. Air ducts 35 below the base 34 communicate to a source of air under pressure.

The perforated disc 34 also serves to impose a sufficient constriction on the flow of air to create a pressure differential, when air flows, adequate to overcome the weak spring 36 and force the gate 32 into the barrel 12.

FIG. 3 shows the first major step in the operation of this machine. An inner tube 40 having a valve body 42 which is attached to the rubber mount 44 is placed against the mouth of the barrel 12 so that the valve body enters the barrel 12. This is done only after a valve core 26 has been placed in the barrel 12. It might be noted, at this point, that the major axis of the barrel 12 is preferably inclined at between 15° and 20° horizontal with the mouth of the barrel 12 pointing upwardly so that the valve cores 26 can be readily dropped far enough back into the barrel 12 so as to be as far as possible behind the opening 28. With the inner tube 40 and its valve body 42 in place, the operator turns on compressed air which flows up through the air ducts 35 to impinge on the perforated base 34 thereby forcing the gate 32 upward into the barrel 12. The spring 36 is selected to give under the force of the air pressure.

The gate 32 projects transversely into the barrel 12 thereby preventing the core 26 from working its way into the valve body 42. The gate 32 is provided with splines 48 so as to provide passageway through the shaft 30 for the compressed air. With the gate 32 holding the core 26 back, the compressed air flows through the wide opening provided by the valve body 42 and thus into the tire tube 40. When inflated in this fashion, the tire tube 40 can be inflated in ⅓ the time taken when the inflating is through the valve core. In one operation, the time saved ranged from 2 to 5 seconds on each tube 40 depending from the size of the tube.

The purpose of the gate 32 is to make sure that the air under pressure does not blow the core 26 into the opening provided by the valve body 42 and thereby restrict passage into the tube 40. For simplicity, the core 26 is shown entirely clear of the opening 28 and the gate 32 is in front of the entire core 26. Depending upon the particular design and the extent to which the operator makes sure that the core 26 is inserted into the barrel 12, the core 26 might well sit above the opening 28. In such a case, the gate 32 will engage the core 26, holding it in place and thus preventing it from being blown into the body 42.

The next step in the operation of this machine is illustrated in FIG. 4. After the tube 40 has been inflated to the desired degree, the compressed air is turned off and the tube 40 is pushed against the mouth of the barrel 12 to force the barrel 12 back against the spring 16 thereby causing the barrel 12 to retract. The valve body 42 then engages the base portion of the valve core 26 to push the pin end of the core 26 against the seat of the core driver 24. The forwardly facing seat of the core driver 24 is so cammed and cut that it causes the pin end of the valve core 26 to become seated in and held by the core driver so that the valve core 26 becomes coaxial with the main axis of the core driver 24. A more detailed description of this front end seat of the core driver 24 and its operation is provided below in connection with FIGS. 7–11.

The core driver 24 is actually rotating while the tube 40 is pressing the barrel 12 back and, as will be described below, such rotation is necessary in order to properly seat and hold the core 26 in the core driver 24. Thus as the operator continues to press the tube 40 against the barrel 12, the rotating and aligned valve core 26 is screwed into the interior threads of the valve body 42. As may best be seen in FIG. 5, the valve body 42 has to slip over the core driver 24 so that the core driver 24 can screw the valve core 26 down into the valve body 42. For the operation to proceed in this fashion, the retractable sleeve 20 is pushed back against its spring 22 by the valve body 42.

The core driver 24 is driven by a motor through a standard electro-magnetic clutch 50 so that the core driver 24 stops rotating when the core 26 is seated to the torque determined by the electro-magnetic clutch 50. It should be noted that the guide sleeve 20 (together with its spring 22) as well as the core driver 24 are both mounted on the drive shaft 51 which is in turn driven by the electro-magnetic clutch 50. Thus the guide sleeve 20 rotates with the core driver 24.

In terms of timing, the operator must shut off the air flow before pressing the tube 40 hard against the barrel 12. This is necessary so that the fluted gate 32 will retract and leave the valve core 26 free to be properly engaged by the valve body 42.

FIG. 5 illustrates the final step in the assembly of the valve in which the valve core 26 is fully threaded into the valve body 42. Since it is normally desired to make sure that the pin 54 of the core 26 not extend above the body 42, it is necessary in this assembly operation that the valve body 42 extend around the outside of the core driver 24 as illustrated in FIG. 5. For this to happen, the sleeve 20 retracts under pressure from the valve body 42 and, as described above, the sleeve 20 is spring loaded in a normally forward position so that it will retract in this required fashion and permit the core driver 24 to screw the core 26 all the way down into the valve body 42.

The air ducts 35 and 30 are contained within a casing 52 which is, in the embodiment shown, rigidly attached near the front end of the barrel 12 by means of the screw 53. Since the barrel 12 must retract under pressure from the tube 40, this casing 52 will have to travel with the barrel 12. Accordingly, it is desirable that the air ducts connected to the duct 35 be flexible tubing in part, at least, so that the casing 52 will be free to move appropriately.

FIG. 7 is a perspective view of the core driver 24 which is adapted to engage the pin 54 end of the core 26 shown in FIG. 8. The shallow V cammed surfaces 24A and 24B serve to appropriately deflect the pin 54 of the valve core 26 as the valve body 42 pushes the core 26 into the core driver 24 (which occurs when the operator pushes against the barrel 12 with the tube 40). The diameter of the inside of the barrel 12 must be sufficient to accommodate the outside diameter of the valve body 42 and thus the valve core 26 will rest in the barrel 12 off center much as is shown in FIG. 1. Thus the pin 54 of the valve core 26 will not directly slip into the center opening 24C in the core driver 24 and in order to avoid damage to the pin 54 as well as to assure that it is properly seated and thus properly centered, the cammed surfaces 24A and 24B are arranged, as shown in FIGS. 7, 9, 10 and 11, to appropriately deflect the pin 54.

The sleeve 20 has a front surface 20A which is cut at an angle to the vertical and which acts in cooperation with the shallow V surfaces 24A and 24B to assure proper seating of the pin 54.

When the pin comes toward the surfaces 24A and 24B, it is guided by whichever one of these surfaces the pin 54 hits toward the central slot between the surface 24A and the surface 24B. Once the pin 54 is in the area of that slot, the shoulder 55 will be deflected by the sloping surface 20A to center the core 26 and permit the pin 54 to enter the opening 24C.

It should be remembered that during this operation of seating the valve core 26, the core driver unit rotates as shown by arrows in the figures. The shallow V surfaces 24A and 24B are each composed of two flat surfaces, indicated as 24A′, 24A″, 24B′ and 24B″ in FIG. 11. When considering the direction of rotation of the core driver 24, the leading flat surfaces 24A′ and 24B′ are substantially perpendicular to the axis of the core driver 24. The lagging flat surfaces 24A″ and 24B″ are cut back from the face of the core driver 24. Thus if the pin 54 hits a perpendicular surface 24A′ or 24B′, the pin 54 will ride on that surface toward the cut back surface 24A″ or 24B″ and will then ride on the cut back surface until within the slot between the two shallow V surfaces 24A and 24B.

Once the pin 54 is within the slot between 24A and 24B, further rotation of the core driver 24 will catch the U-shaped rectangular threaded portion 56 between the surfaces 24A and 24B, thereby holding the valve core 26 to screw it into the valve body 42. Simultaneously, the sleeve surface 20A centers the core 26 so that the core pin 54 enters the opening 24C. And, as mentioned above, the sleeve 20 then retracts so that the valve body 42 can slip over the core driver 24 as the core 26 is screwed down into the body 42.

One particular operable embodiment of this invention has been described in some detail. It will be obvious to those skilled in this art that many variations in the details described may be employed without departing from the scope of this invention. It is intended in the claims to cover all such variations.

What is claimed is:

1. A tire valve assembly machine for inflating a tube and assembling a valve core into a valve body mounted on the tube comprising:
   a frame,
   a valve core driver rotatably mounted on said frame and having a front end adapted to receive and hold the pin end of a valve core, a barrel surrounding said core driver and extending forward of said front end of said core driver, said barrel being retractably mounted on said frame and having a front end opening adapted to receive a valve body, said barrel having a wall opening adapted to admit air under pressure, and a normally retracted gate at said wall opening of said barrel, said gate being operable to protrude into said barrel when air under pressure is admitted through said wall opening into said barrel.

2. A tire valve assembly machine for inflating a tube and assembling a valve core into a valve body mounted on the tube comprising:

a frame, a valve core driver rotatably mounted on said frame and having a front end adapted to hold the pin end of a valve core, a barrel surrounding said core driver and extending forward of said front end of said core driver, said barrel being retractably mounted on said frame and having a front end opening adapted to receive a valve body, said barrel having a wall opening adapted to admit air under pressure, and gate means for holding whatever valve core may be placed in said barrel from entering whatever valve body may be placed at said front end of said barrel when compressed air is supplied to the interior of said barrel through said wall opening.

3. A tire valve assembly machine for inflating a tube and assembling a valve core into a valve body mounted on the tube comprising:

a frame, a valve core driver rotatably mounted on said frame and having a front end adapted to hold the pin end of a valve core, a barrel spaced from and surrounding said core driver, said barrel being retractably mounted on said frame, said barrel having a front end opening extending forward of said front end of said valve core driver and adapted to receive a valve body, said barrel having a wall opening adapted to admit air under pressure, a sleeve sandwiched between said core driver and said barrel, said sleeve being retractably mounted to said core driver, said sleeve having a wall thickness at least equal to the wall thickness of the body of whatever valve is being assembled, and gate means at said wall opening of said barrel for holding whatever valve core may be placed in said barrel from entering whatever valve body may be placed at said front end of said barrel when compressed air is supplied to the interior of said barrel through said wall opening, said gate means being normally retracted from the inside of said barrel.

4. The tire valve assembly machine of claim 3 further characterized by:

said front end of said core driver unit having two shallow V-shaped surfaces separated by a slot, said slot being adapted to hold the rectangular threaded portion near the pin end of a valve core, said V-shaped surfaces being adapted to deflect the pin of a valve core that is being pushed longitudinally backwards, and said sleeve having a sloping forwardly facing edge, said edge sloping rearwardly when going from the outer diameter of said sleeve to the inner diameter of said sleeve, whereby said sloping forwardly facing edge of said sleeve will deflect a valve core that is being pushed longitudinally backwards toward the center axis of said core drived thereby assisting in the seating of said pin end of said valve core on said front end of said core driver.

5. The tire valve assembly machine of claim 4 wherein said shallow V-shaped surfaces are each composed of one flat surface substantially perpendicular to the axis of said core driver unit and one surface cut back at an angle to said axis.

6. A tire valve assembly machine for inflating a tube and assembling a valve core into a valve body mounted on the tube comprising:

a frame, a valve core driver rotatably mounted on said frame and having a front end adapted to hold and axially align the pin end of a valve core, a sleeve retractably mounted on said core driver and having a wall thickness at least equal to the wall thickness of the body of whatever valve is to be assembled, means for rotating said core driver and sleeve as a unit, a barrel rearictably mounted on said frame and surrounding said sleeve, said barrel having a front end extending forward of the front end of said core driver, said front end of said barrel being adapted to receive a valve body and having a wall opening adapted to admit air under pressure, and a normally retracted gate positioned at said wall opening of said barrel, said gate being operable to protrude into said barrel when air under pressure is admitted into said barrel through said wall opening, whereby the admission of said air under pressure through said wall opening will cause said gate to protrude into said barrel to engage whatever valve core may be in said barrel thereby permitting air to flow into the tube through the valve body without having the valve core obstruct the flow of air, and whereby after the flow of air under pressure through said wall opening of said barrel is stopped, said gate will retract and said means for rotating said core driver and said sleeve may be actuated to rotate said core driver thereby rotating said valve core into said valve body.

7. The tire valve assembly machine of claim 6 further characterized by:

said front end of said core driver unit having two shallow V-shaped surfaces separated by a slot, said slot being adapted to hold the rectangular threaded portion near the pin end of a valve core, said V-shaped surfaces being adapted to deflect the pin of a valve core that is being pushed longitudinally backwards, said sleeve having a sloping forwardly facing edge, said edge sloping rearwardly when going from the outer diameter of said sleeve to the inner diameter of said sleeve, whereby said sloping forwardly facing edge of said sleeve will deflect a valve core that is being pushed longitudinally backwards toward the center axis of said core driver thereby assisting in the seating of said pin end of said valve core on said front end of said core driver.

8. The tire valve assembly machine of claim 7 wherein said shallow V-shaped surfaces are each composed of one flat surface substantially perpendicular to the axis of said core driver unit and one surface cut back at an angle to said axis.

References Cited by the Examiner

UNITED STATES PATENTS

| | | | |
|---|---|---|---|
| 2,900,709 | 8/59 | Harrison | 29—211 |
| 2,974,406 | 3/61 | Vilmerding | 29—211 |
| 2,980,992 | 4/61 | Black | 29—208 |

WHITMORE A. WILTZ, *Primary Examiner.*

THOMAS H. EAGER, *Examiner.*